United States Patent Office 2,869,749
Patented Jan. 20, 1959

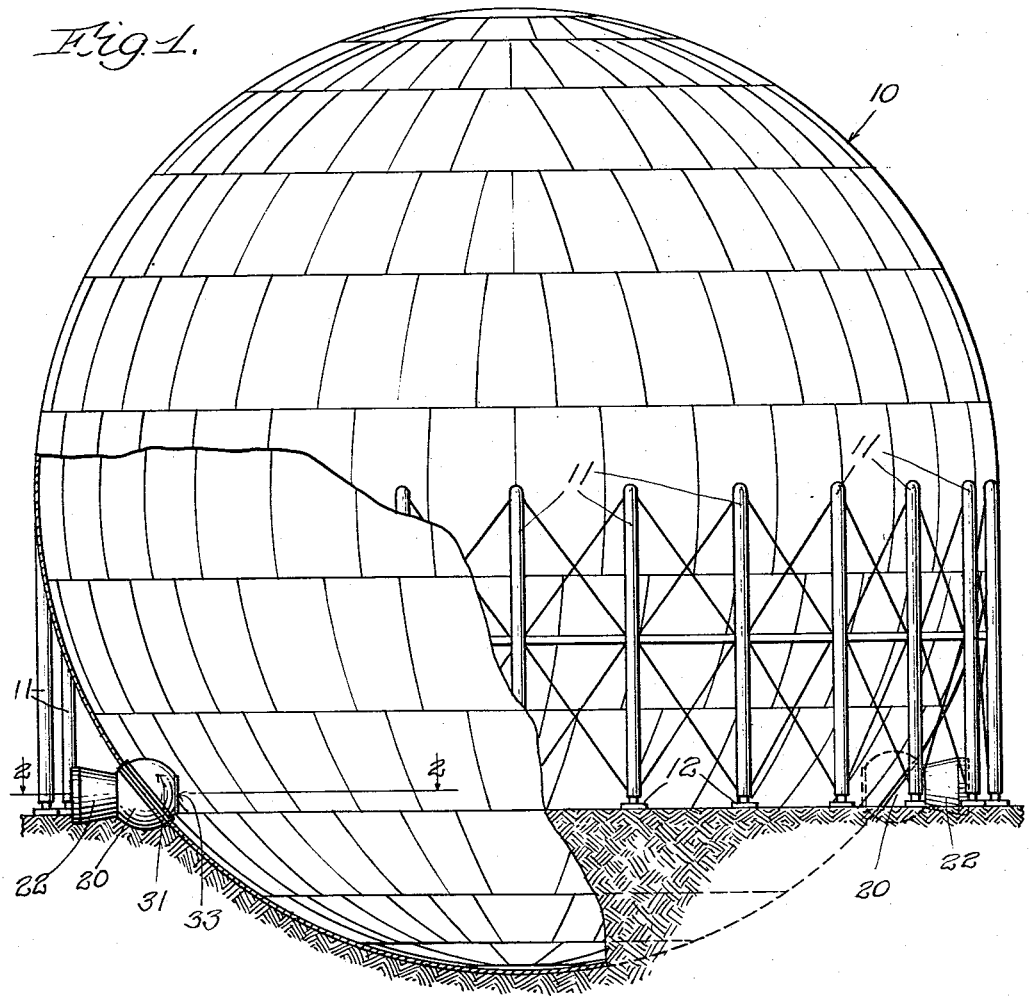
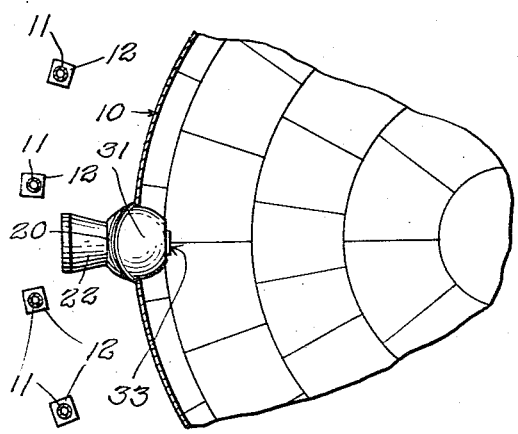

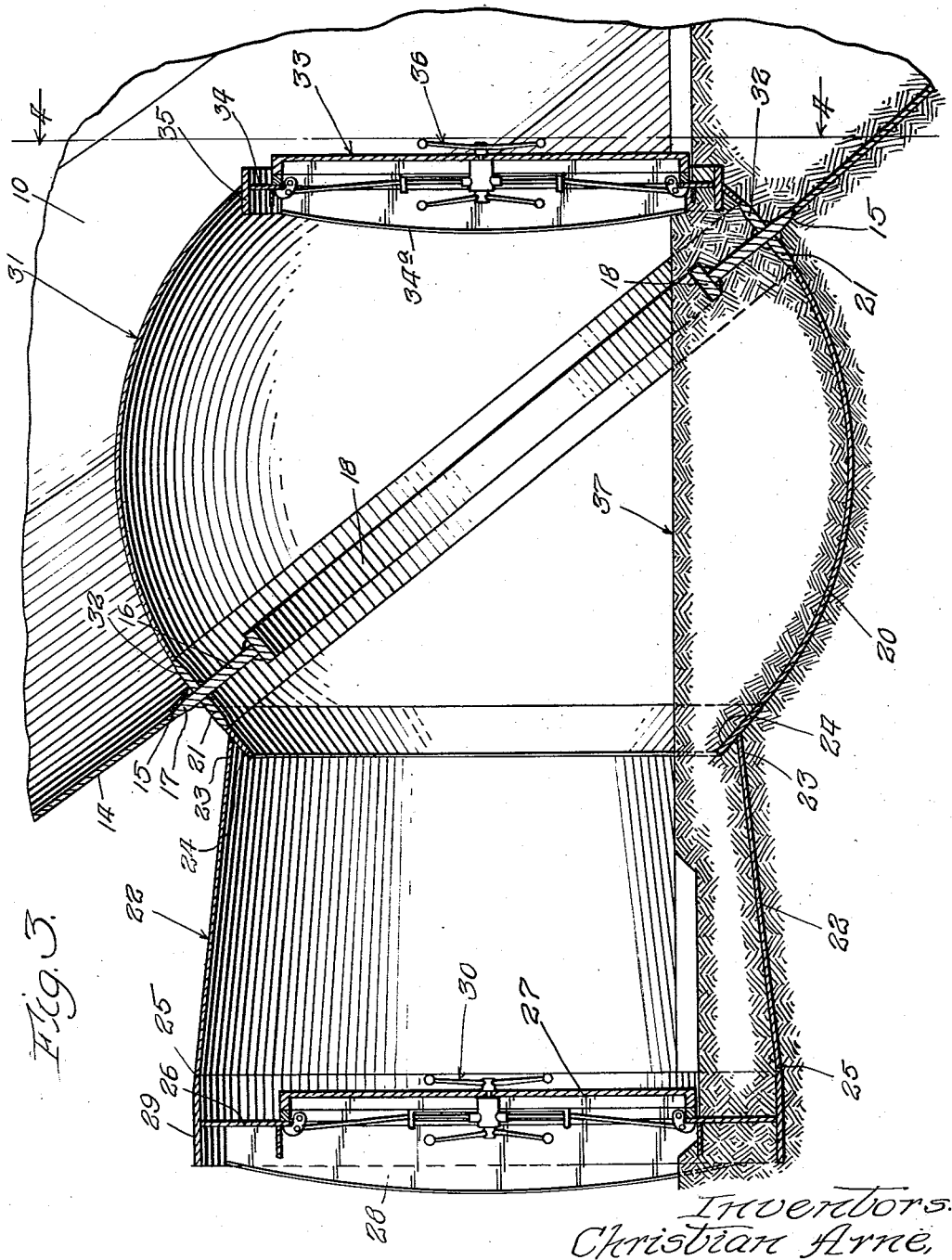

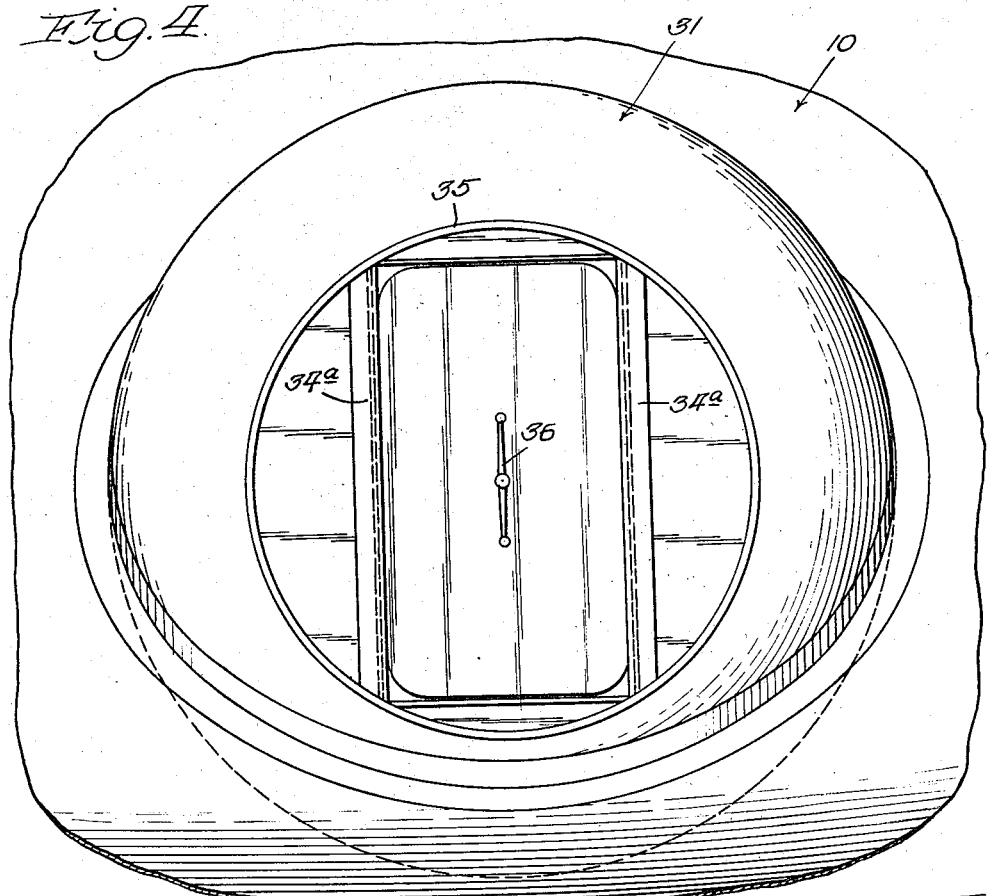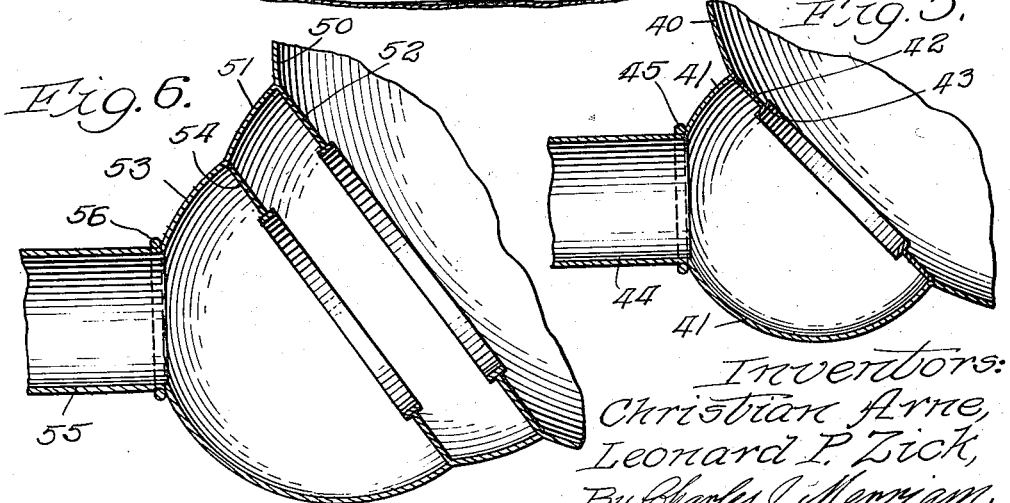

2,869,749

PENETRATION STRUCTURE FOR PRESSURE VESSELS

Christian Arne and Leonard P. Zick, Chicago, Ill., assignors to Chicago Bridge & Iron Company, a corporation of Illinois Application April 27, 1954, Serial No. 425,986

5 Claims. (Cl. 220—1)

This invention relates to the penetration of shells and more particularly to a penetration or access structure utilized in providing a connection with an opening into the interior of a pressure vessel or shell.

Connections have been made between pipe lines or between pipe lines and pressure vessels by the use of fittings which have flanges to which the lines can be connected. The flanges resist the stresses which are present due to the opening in the vessel. This general type of connection is one which can be easily made with known procedures. It is not suitable, however, for relatively large openings in pressure vessels.

The penetration structure with which the present invention is concerned can be used to provide an opening in the wall of a large pressure vessel, that is, a relatively large opening in the wall of a pressure vessel of any size such as a connection between large pipe lines or similar pressure vessel structures, or a relatively large connection between structures of the latter type of any size.

When penetrations are made through shells, the membrane stresses acting on the cut edges must be resisted by added reinforcement. For an approximately circular opening these membrane stresses are symmetrical and act generally in a plane and can be resisted by adding thickness to the shell around the opening. The A. S. M. E. boiler code specifies that the cross section of this added thickness within a distance from the center equal to the diameter of the hole must be at least equal to the cross section of the shell removed by the opening. This code also points out that for vessels over 60 inches in diameter this method of reinforcement with the dimensions specified is no longer adequate for openings having a diameter greater than 40 inches or greater than one third the vessel diameter. Our invention relates principally to these openings which require special attention.

Reinforcement about an opening is most effective at the edge of the opening and its effectiveness decreases with its distance from the edges of the opening. One difficulty in reinforcing relatively large openings is in the provision of sufficient metal concentrated at the edge of the opening. The requirement may be such that a reinforcing ring would be so large and heavy that ordinarily it should be a forging, or, if welded, should be stress relieved.

One advantage of the present invention is that the requirements of a single large ring may be divided up into a number of reinforcing rings of small size. This permits the rings to be formed of welded plates whereas otherwise a large ring might be impractical.

This invention makes use of the fact that the intersection of two spheres is a circle, with the membrane forces at the intersection uniform. For example, in the structure of this invention we may employ a relatively small sphere intersecting a large spherical storage vessel.

The intersection of a cylinder with a sphere is not circular unless the axis of the cylinder coincides with a radial line of the sphere. With large spherical pressure vessels this is often not the most convenient angle, however, and thus an opening made in the preferred direction would result in unbalanced stresses difficult to resist. A reinforcement for such an opening would be complicated in structure and very difficult to fabricate. The present invention provides a solution to this problem, permitting penetration structures of much simpler design than would otherwise be the case.

A spherical section can be used to intersect the spherical shell of the storage vessel so that the intersection will be circular and the membrane stresses will be of a balanced character. These stresses may be resisted by a properly designed reinforcing ring.

In addition, a cylindrical section may intersect the small spherical section and, in effect, change the direction of the penetration if needed. The intersection of the cylinder and the small spherical section can be reinforced since here the intersection can be made a circle and a suitably uncomplicated reinforcing ring can be provided to withstand the membrane stresses.

Examples of the application of the principles of the present invention are illustrated in the accompanying drawings in which:

Figure 1 is an elevational view partly cut away and partly in section of a spherical pressure vessel with a diameter of the order of about 200 feet or more, showing a penetration structure of this invention therein;

Figure 2 is a fragmentary horizontal sectional view taken along line 1—1 through the vessel illustrated in Figure 1 through the center of the penetration sphere but showing the complete penetration structure;

Figure 3 is a fragmentary vertical sectional view through the penetration structure illustrated in Figures 1 and 2 on a scale larger than that illustrated in Figures 1 and 2 to illustrate the details of the structure;

Figure 4 is a fragmentary sectional view taken substantially along line 4—4 in Figure 3 looking outwardly toward the penetration structure from inside the large pressure vessel;

Figure 5 is a fragmentary sectional view through a modified structural form of the invention; and Figure 6 is a view similar to Figure 5 of another modified structural form of the invention.

Figures 1 through 4 of the drawings illustrate the use of the present invention as a penetration structure or an access means into the interior of a very large pressure vessel. The vessel in the form of a sphere or spheroid 10 in which the penetrating structure is placed is supported by a plurality of posts 11 resting on pedestals 12 on the ground. The entire structure is quite large, the vessel itself in the embodiment shown having, as already stated, a diameter of the order of about 200 feet or more. The vessel thus assumes the proportions of a large building.

The penetration structure is at the ground elevation and comprises the means for human and mechanical passage into and out of the vessel. It also incorporates a lock since the penetrating structure is carried inside the shell of the vessel and is equipped with interior and exterior doors one or both of which can be sealed against pressure in the large sphere 10. If only one of the doors is sealed, access to and from the large vessel may still be obtained with a minimum loss of internal pressure.

When the interior door is closed the portion of the lock structure inside the large vessel alone resists the pressure and is in compression. When the exterior door is closed and the interior door is open the portion of the lock structure outside the large vessel is under internal pressure. The penetrating structure is sufficiently large to permit persons to walk through the structure and lock as one would walk through a hallway into a public building.

The plates 14 of the large pressure vessel 10 are provided with an opening 15 which is quite large and therefore under load would be overstressed if reinforced in the conventional manner provided in the A. S. M. E. code. An important part of the reinforcement of this opening to take care of the membrane stresses is a structural ring welded in place in the opening and extending inwardly of the periphery of the opening 15. The structural ring includes a relatively heavy web 16 having an outer portion 17 tapered to a lesser thickness so as to be readily joined by welding to the plates 14 of the large vessel. The inner edge of the web 16 which is in effect a continuation of the plates 14 is joined to a heavy flange 18 annular in shape and welded by partial welds to the web 16. This flange concentrates a great amount of metal immediately at the periphery of the opening. This structural ring may be welded up as a unit, then stress relieved in a furnace and then welded to the plates 14 at the opening 15.

It will be noted from Figures 1 and 3 particularly that the opening defined by placing the ring in the opening 15 in the vessel is one oblique to the general direction of penetration desired.

Access into the vessel is substantially horizontal and at ground elevation whereas the slope of the plates making up the shell of the vessel at this area is at quite an angle to horizontal and vertical. In order that the penetration may be made along a desired line or direction, a substantially spherical section 20 much smaller than the large vessel or sphere 10 and having an access opening is provided and attached to the structural ring. A relatively heavy flange 21 is joined to the outside of web 16 of the ring by full penetration welds so that it becomes an integral part of the ring. The plates of the spherical section 20 are joined to this side flange by appropriate welding procedure whereby the flange in effect becomes a part of the spherical section.

The use of the spherical penetrating section permits access to that section at varied angles since any radial intersection of a tubular connecting section with the sphere 20 will be a circle which may be easily reinforced by a ring. With an intersection other than a circle, the membrane forces would be unbalanced and much more difficult to resist.

The particular form of the invention used herein utilizes a conical section 22 as a connecting section with its small end 23 intersecting the spherical section 20. A reinforcing ring 24 is interposed between the conical and spherical sections for reinforcing the juncture of the two. The larger end 25 of the conical section is utilized for mounting a bulkhead 26 in which a door 27 may be mounted. The bulkhead may be stiffened by girders 28 against collapse under pressure within the lock and the outer portion of the bulkhead may be a reinforcing ring 29 joined to the larger end of the conical section 22. The door 27 is one of standard design utilized on locks. An operating structure, generally indicated 30, is provided for securing the door in place and may be operated from both inside and outside of the door.

The particular advantage in the use of a conical surface 22 as shown in Figure 3 is that it permits a minimum opening into the spherical section which it intersects, while permitting a maximum opening in the larger outer end for placement of an access door which can open inwardly without fouling the conical section. The advantage of the inward opening is of course that the internal pressure helps seal the door.

In order that a lock be provided for access into the vessel 10, the intersecting spherical section 20 is continued inside the shell 14. This continuation is indicated as a second spherical section 31 joined to a relatively heavy side flange 32 secured to the inside of web 16 of the ring structure. The radius of curvature of the section 31 is the same as that of the section 20 and except for the intervening ring and flanges, it is a continuation of the spherical section 20.

A door 33 is mounted in a bulkhead 34 having stiffeners 34a and reinforced by a ring 35 in an opening in the spherical section 31 aligned generally normal to the direction of access desired. This door also has operating controls 36 of the usual nature. Since the particular illustration of the invention is for use as access and as a lock, the ground level 37 is shown as extending through the lock as well as inside the large vessel. This may be filled and covered with a suitable floor material so that in passing through the lock, one is not particularly conscious of the structure of the spherical sections 20 and 31 or the conical section 22. These sections, however, are extremely important from the standpoint of pressure resistance.

It should be noted that the heavier side flanges 21 and 32, as well as the rest of spherical sections 20 and 31, all act to help reinforce shell opening 15 against membrane stresses. This is in addition to the reinforcement mentioned above which is provided by the ring composed of web 16 and flange 18.

Figure 5 of the drawings indicates a slightly different structure wherein a large pressure vessel or shell 40 is intersected by a small spherical section 41 and the intersection is provided with an inwardly extending reinforcing ring assembly having a web 42 and an inner peripheral flange 43 concentrating metal at the periphery of the opening through the ring. A round cylindrical section 44 is arranged at an angle to the general direction of the opening into the vessel. This section pierces the spherical section 41 and is reinforced at the line of intersection by a reinforcing ring 45. Each of the sections 44 and 40 is capable of withstanding the pressure to which any of them would be subjected. However, the reinforcing required is provided at the intersections of the sections, each of which is a circle, greatly simplifying the calculation of forces and building of reinforcing rings to withstand the forces applied. A change in direction of penetration or access may be easily made by utilizing the structure illustrated in Figure 5. It also permits a straight direct penetration without the difficulties usually attendant with doing so, particularly with a cylindrical section.

In Figure 6, a structure is illustrated in which the reinforcing ring at the entry into the vessel is, in effect, split into separate structures. The particular advantage of this construction is that thinner plates may be used and the rings may be made up of plates welded together into several large diameter rings rather than having one heavy ring which should be a forging or, if welded, should be stress relieved.

The large pressure vessel 50 is penetrated first by a spherical section 51 with a reinforcing ring assembly 52 at the intersection, arranged in the manner described for reinforcing rings above. The first spherical section 51 is intersected by a spherical section 53 and a reinforcing ring assembly 54 is arranged at the intersection of these two sections. Thus, in effect, the reinforcing ring assemblies required in the penetration of the vessels in Figures 3 or 5 may be split into two separate ring assemblies 52 and 54 by utilizing the structure illustrated in Figure 6.

The outer spherical section 53 may be penetrated by a cylindrical connecting section 55 and a reinforcing ring 56 at the intersection. It should be understood that reinforcing ring assemblies such as ring 54 may also, if desired, be arranged to extend outwardly from the opening at which they are positioned.

The principles of this invention may be applied to penetration of relatively large pipe lines or to relatively large openings in pipe lines of any size. It is sometimes desirable in such cases, and where there is a change of direction it may be necessary, to streamline the surfaces inside the spherical surfaces in order to obtain proper hydraulic properties. It should be understood that under these circumstances, the spherical surfaces are still carrying the pressure load.

The foregoing detailed description has been given for clearness of understanding only. No unnecessary limitations should be understood therefrom, for modifications will be obvious to those skilled in the art.

We claim:

1. A penetration structure for providing an access connection through a relatively large opening in the wall of a spheroidal pressure vessel, said vessel having a diameter substantially greater than that of said opening, said structure comprising a reinforcing ring extending from and forming a continuation of the marginal wall portions of the pressure vessel surrounding said opening, a stress resisting flange secured to the inner peripheral edge of said ring, and a spherically shaped access connection secured to said ring adjacent said opening, the line of penetration through said vessel being non-coincident with any radii of the vessel.

2. A penetration structure for providing an access connection through a relatively large opening in the wall of a pressure vessel, said vessel having a diameter substantially greater than that of said opening, said structure comprising a reinforcing ring extending from and forming a continuation of the marginal wall portions of the pressure vessel surrounding said opening, a stress resisting flange secured to the peripheral edge of said ring and a spherically shaped access connection secured to said ring adjacent said opening, said spherical access connection extending inwardly into the pressure vessel beyond said opening.

3. A penetration structure for providing an access connection through a relatively large opening in the wall of a spheroidal pressure vessel, said vessel having a diameter substantially greater than that of said opening, said structure comprising a reinforcing ring extending from and forming a continuation of the marginal wall portions of the pressure vessel surrounding said opening, a stress resisting flange secured to the inner peripheral edge of said ring, and a spherically shaped access connection secured to said ring adjacent said opening, the line of penetration through said vessel being non-coincident with any radii of the vessel, said access connection comprising a spheroid truncated at opposed poles in a plane normal to the line of penetration, a tubular passageway depending outwardly from said spheroid coaxial with said line of penetration and affixed adjacent the marginal exterior edge of said spheroid, a first bulkhead having an access opening provided therein enclosing the terminal extremity of said tubular passageway, a door hinged to said first bulkhead providing a fluid tight closure for said access opening, a second bulkhead having an access opening provided therein enclosing the marginal interior edge of said spheroid, and a door hinged to said bulkhead providing a fluid tight closure for said access opening.

4. A penetration structure in accordance with claim 3 in which an intermediate spheroidal portion having a smaller radius than said truncated spheroid is employed to interconnect said tubular passageway and said truncated spheroid, said intermediate spheroid portion being provided with a stress resisting flange secured to the inner peripheral edge of a second reinforcing ring depending inwardly at the juncture of said truncated spheroid and said intermediate spheroidal portion.

5. A penetration structure for providing an access connection through a relatively large opening in the wall of a spheroidal pressure vessel, said vessel having a diameter substantially greater than that of said opening, said structure comprising a reinforcing ring extending from and forming a continuation of the marginal wall portions of the pressure vessel surrounding said opening, a stress resisting flange secured to the inner peripheral edge of said ring, and a spherically shaped access connection secured to said ring intermediate the extremities of said access connection and adjacent said opening, the line of penetration through said vessel being non-coincident with any radii of the vessel, said access connection comprising a spheroid truncated at opposed poles in a plane normal to the line of penetration, a truncated conical shell having an inwardly converging side wall affixed adjacent the marginal exterior edge of said spheroid in alignment with the line of penetration, a first bulkhead having an access opening provided therein enclosing the larger diameter terminal edge of said conical shell, a door hinged to said bulkhead and providing a fluid tight closure for said access opening, a second bulkhead having an access opening provided therein enclosing the marginal exterior edge of said truncated spheroid, a door hinged to said bulkhead providing a fluid tight closure for said access opening.

References Cited in the file of this patent

UNITED STATES PATENTS

| | | |
|---|---|---|
| 807,795 | Watson | Dec. 19, 1905 |
| 1,118,970 | Thompson | Dec. 1, 1914 |
| 1,490,622 | Miller | Apr. 15, 1924 |
| 1,808,599 | Galeazzi | June 2, 1931 |
| 1,864,837 | Lake | June 28, 1932 |
| 2,359,835 | Ford | Oct. 10, 1944 |
| 2,366,688 | Eisenbeis | Jan. 2, 1945 |
| 2,668,634 | Arne | Feb. 9, 1954 |
| 2,672,254 | Boardman | Mar. 16, 1954 |